(12) United States Patent
Golan et al.

(10) Patent No.: US 7,512,269 B2
(45) Date of Patent: Mar. 31, 2009

(54) METHOD OF ADAPTIVE IMAGE CONTRAST ENHANCEMENT

(76) Inventors: Asaf Golan, Gordon 22, 32764 Haifa (IL); Avraham Levy, Ha'Emek 19B, 36084 Kiryat Tivon (IL)

( * ) Notice: Subject to any disclaimer, the term of this patent is extended or adjusted under 35 U.S.C. 154(b) by 629 days.

(21) Appl. No.: 11/196,320

(22) Filed: Aug. 4, 2005

(65) Prior Publication Data
US 2007/0031055 A1 Feb. 8, 2007

(51) Int. Cl.
*G06K 9/00* (2006.01)
(52) U.S. Cl. ..................... 382/168
(58) Field of Classification Search ......... 382/166–172, 382/254, 270–271, 274; 348/671–674; 358/3.21–3.27, 358/520–522
See application file for complete search history.

(56) References Cited

U.S. PATENT DOCUMENTS

| | | | | |
|---|---|---|---|---|
| 5,748,802 A | * | 5/1998 | Winkelman | 382/271 |
| 5,774,593 A | * | 6/1998 | Zick et al. | 382/236 |
| 5,828,793 A | * | 10/1998 | Mann | 382/284 |
| 6,101,294 A | * | 8/2000 | McCaffrey et al. | 382/312 |
| 6,148,103 A | * | 11/2000 | Nenonen | 382/169 |
| 6,463,173 B1 | * | 10/2002 | Tretter | 382/168 |
| 6,750,906 B1 | * | 6/2004 | Itani et al. | 348/229.1 |
| 6,810,144 B2 | * | 10/2004 | McGee et al. | 382/166 |
| 7,127,123 B2 | * | 10/2006 | Wredenhagen et al. | 382/274 |
| 7,167,597 B2 | * | 1/2007 | Matsushima | 382/274 |
| 7,221,807 B2 | * | 5/2007 | Campbell | 382/274 |
| 7,336,830 B2 | * | 2/2008 | Porter et al. | 382/218 |
| 2003/0117654 A1 | | 6/2003 | Finn | |

FOREIGN PATENT DOCUMENTS

| | | |
|---|---|---|
| EP | 0335419 A2 | 10/1989 |
| EP | 0772158 A2 | 5/1997 |
| EP | 0856813 A2 | 8/1998 |
| EP | 1336852 A2 | 8/2003 |
| WO | PCT/US2006/030358 | 5/2006 |

* cited by examiner

*Primary Examiner*—Jose L Couso
(74) *Attorney, Agent, or Firm*—Trop, Pruner & Hu, P.C.

(57) ABSTRACT

The contrast of a digital image is enhanced by forming a histogram of the luma values of an active area of the image, computing "initial" bin indices that partition the histogram into bins of substantially equal population, mapping the "initial" bin indices into "final" bin indices that are more uniformly spaced than the "initial" bin indices, and adjusting the luma values of all the pixels in accordance with the "final" bin indices.

26 Claims, 7 Drawing Sheets

METHOD OF ADAPTIVE IMAGE CONTRAST ENHANCEMENT

FIELD AND BACKGROUND OF THE INVENTION

The present invention relates to digital image processing and, more particularly, to a method of enhancing the contrast of a digital image by manipulating a histogram of pixel luma values.

Contrast enhancement based on histogram equalization is a standard technique in image processing. Unlike local techniques such as filtering that change a pixel value with reference only to the values of neighboring pixels, contrast enhancement is a global method that changes pixel values based on the histogram of the entire image. Contrast enhancement therefore has a significant impact on the overall appearance of an image. Contrast enhancement emphasizes weak details and can "illuminate" image regions that initially are dim.

There are two challenges in the contrast enhancement of video signals: avoiding noise amplification and enhancing the contrast of the images in real time.

With respect to noise amplification, just as signal details of the image are emphasized by contrast enhancement, so, too, noise is amplified by contrast enhancement. Special care must be taken to minimize such artifacts in noisy video signals.

With respect to real time contrast enhancement, contrast enhancement methods correct the pixel values of a video frame only after the complete histogram of the frame has been computed. Therefore, real-time contrast enhancement requires one or another form of delay. Usually, either the correction computed for each frame is applied to a subsequent frame or each frame is delayed long enough to have its own correction applied.

Contrast enhancement techniques are described in basic textbooks on image processing, for example A. K. Jain, *Fundamentals of Digital Image Processing* (Prentice-Hall, 1988). The standard prior art histogram equalization technique is performed as follows:

1. Compute the image histogram H(g): the number of pixels with the gray level g, where g is an integer in the interval [0,N].
2. Compute the cumulative histogram $$F(g) = \frac{\sum_{k=0}^{g} H(g)}{\sum_{k=0}^{N} H(g)}.$$

Denote by $F_{min}$ the smallest positive value obtained in the cumulative histogram, i.e., the first non-zero H(g) divided by the sum of all the H(g).

3. Transform the pixels whose gray value is g to an "equalized" new resolution [0, . . . , L] according to $$P(g) = \left\lfloor \left( \frac{F(g) - F_{min}}{1 - F_{min}} \right) L + 0.5 \right\rfloor.$$

To produce an image with an enhanced contrast, the value L=N is used. For dynamic range reduction (data quantization) purposes, values of L that are less than N are used.

Applying this standard method or similar techniques to the frames of a video sequence may result in temporal discontinuities and may exhibit unstable performances on different types of scenes, such as outdoor scenes vs. indoor scenes. Therefore, the standard techniques must be modified for use with video image streams with their additional dimension of time. In addition, the method should be robust, should perform well on a wide class of typical video sequences, and should have sufficiently low complexity to be implemented in real time. Prior art patents that have addressed this and related problems include:

Opittek et al., U.S. Pat. No. 3,979,555
Ketcham et al., U.S. Pat. No. 3,983,320
Fitch et al., U.S. Pat. No. 4,231,065
Bailey et al., U.S. Pat. No. 4,353,092
Ackermann, U.S. Pat. No. 4,450,482
FitzHenry et al., U.S. Pat. No. 5,063,607
Fujimura et al., U.S. Pat. No. 5,808,697
Bhaskar, U.S. Pat. No. 6,393,148
Bhaskar, U.S. Pat. No. 6,580,825
Choi, U.S. Pat. No. 6,771,320
Stessen, U.S. Pat. No. 6,781,636
Huniu, US Published Patent Application No. 2003/0007689
Kim, US Published Patent Application No. 2003/0025838
Young et al. US Published Patent Application No. 2003/0091222
Srinivasa, US Published Patent Application No. 2004/0042676

SUMMARY OF THE INVENTION

According to the present invention there is provided, for an image that includes a plurality of pixels, each pixel having a respective initial luma value and two respective initial chroma values, a method of adjusting the initial luma values, including the steps of: (a) forming a histogram of the initial luma values of at least a portion of the pixels; (b) computing a plurality of initial bin indices that partitions the histogram into a plurality of bins that have substantially equal populations; (c) mapping the initial bin indices into a plurality of final bin indices that are spaced more uniformly than the initial bin indices; and (d) adjusting the initial luma values in accordance with the final bin indices, thereby obtaining, for each pixel, a respective final luma value.

According to the present invention there is provided, for an image that includes a plurality of pixels, each pixel having a respective initial value, a method of adjusting the initial values, including the steps of: (a) forming a histogram of the initial values of at least a portion of the pixels; (b) computing a plurality of initial bin indices that partitions the histogram into a plurality of bins that have substantially equal populations; (c) mapping the initial bin indices into a plurality of final bin indices that are spaced more uniformly than the initial bin indices; and (d) adjusting the initial values in accordance with the final bin indices, thereby obtaining, for each pixel, a respective final value.

According to the present invention there is provided a system, including: (a) a memory for storing an image that includes a plurality of pixels, each pixel having a respective value; and (b) a processor for: (i) forming a histogram of the values of at least a portion of the pixels, (ii) computing a plurality of initial bin indices that partitions the histogram into a plurality of bins that have substantially equal populations, (iii) mapping the initial bin indices into a plurality of final bin indices that are spaced more uniformly than the initial bin indices, and (iv) adjusting the values in accordance with the final bin indices.

According to the present invention there is provided a computer readable storage medium having computer readable code embodied on the computer readable storage medium, the computer readable code for processing an image that includes a plurality of pixels, each pixel having a respective value, the computer readable code including: (a) program code for forming a histogram of the values of at least a portion of the pixels; (b) program code for computing a plurality of initial bin indices that partitions the histogram into a plurality of bins that have substantially equal populations; (c) program code for mapping the initial bin indices into a plurality of final bin indices that are spaced more uniformly than the initial bin indices; and (d) program code for adjusting the values in accordance with the final bin indices.

The present invention is directed towards enhancing the contrast of a digital image whose pixels have respective initial chroma and luma values, one luma value and two chroma values per pixel. First, a histogram of the initial luma values of at least a portion of the pixels is formed. Initial "bin indices" are computed that partition the histogram into a plurality of bins, bounded by the initial bin indices, that have substantially equal population. The initial bin indices are mapped into a corresponding plurality of final bin indices that are spaced more uniformly than the initial bin indices. The initial luma values then are adjusted in accordance with the final bin indices to provide final luma values.

Preferably, the histogram is formed using luma values of only some of the pixels.

In one preferred variant of the present invention, the final bin indices are substantially equally spaced. Preferably, the initial luma values are adjusted in accordance with both the initial bin indices and the final bin indices. More preferably, each initial luma value is adjusted by finding the two initial bin indices that bracket that initial luma value and then transforming that initial luma value into a final luma value that is bracketed by a corresponding pair of final bin indices. Most preferably, the transformation is a piecewise linear transformation.

In another preferred variant of the present invention, the mapping of the initial bin indices to final bin indices includes modifying the initial bin indices to obtain a corresponding plurality of modified bin indices that are spaced more uniformly than the initial bin indices. The corresponding final bin indices also are spaced more uniformly than the initial bin indices, but are not necessarily uniformly spaced. More preferably, each initial luma value is adjusted by finding the two modified bin indices that bracket that initial luma value and transforming the initial luma value into a final luma value that is bracketed by a corresponding pair of final bin indices. Most preferably, the transformation is a piecewise linear transformation.

Preferably, the initial bin indices are mapped into the final bin indices via a corresponding plurality of intermediate bin indices. First, the initial bin indices are mapped into intermediate bin indices that are substantially equally spaced. Then the intermediate bin indices are mapped into the final bin indices in accordance with a desired degree of contrast gain.

The above description applies to a color digital image. In the case of a monochrome digital image, that has only one value per pixel, the pixel values are treated in the same way as the pixel luma values of a color digital image are treated.

The scope of the present invention also includes a system for implementing the methods of the present invention and a computer readable storage medium in which is embodied computer readable code that is executed (e.g. by a processor of the system of the present invention) to implement the methods of the present invention.

The closest known prior art to the present invention is the patents of Opittek et al., Ackermann and FitzHenry et al. These patents also teach methods and systems for flattening a histogram of pixel luma/intensity values. Opittek et al. and FitzHenry et al. exactly flatten the histogram. Ackermann fits the histogram to a desired shape that is not necessarily flat. The principal difference between the present invention and the prior art is that the prior art does not explicitly compute initial bin indices that partition the initial histogram into equally populated bins. Another significant difference between the prior art and the embodiment of the invention in which the final bin indices are not necessarily uniformly spaced is that the final bin indices of the present invention are determined a postiori, in the sense that the values of the final bin indices are determined as the outcome of the algorithm for modifying the initial bin indices. In other words, the present invention does not impose an a priori desired shape on the histogram, but instead accepts whatever shape the algorithm produces. By contrast, the final bin indices of the prior art are determined a priori by the desired shape (flat or otherwise) to which the histogram is fit.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of histogram equalization for enhancing the contrast of digital images. Specifically, the present invention can be used to enhance the contrasts of the frames of a video stream.

The principles and operation of contrast enhancement according to the present invention may be better understood with reference to the drawings and the accompanying description.

As noted above, the present invention is applicable to both color images and monochrome images. Nevertheless, the preferred embodiment described herein is a color image embodiment. The input image has three color coordinates: one luma component and two chroma components. Common color coordinate systems that use such components include the YUV coordinate system, the YPrPb coordinate system, the Luv coordinate system and the Lab coordinate system. An input image in some other coordinate system such as RGB must be converted to a luma-chroma coordinate system before the method of the present invention can be applied to the image. The discussion herein uses YUV as an example of a luma-chroma coordinate system. It will be clear to those skilled in the art how to apply the present invention to any other luma-chroma coordinate system. The values of the luma component Y are assumed to be integers in the interval [0,N]. In what follows, the notation "$Y_{i,j}$" is used to denote the value of the luma component of the pixel at image coordinates (i,j) and "y" is used to denote a luma component value in general.

In addition to the input image, the method of the present invention receives five additional input parameters: the active area A, a histogram resolution parameter K, and three contrast gain parameters: C, $\alpha_D$ and $\alpha_L$.

The active area A of the image is the portion of the image whose pixels are used to derive the histogram. An "active area" smaller than the full image is used for numerical efficiency: a statistical sample of the pixels is expected to provide a sufficiently accurate histogram. The active area is not necessarily a single contiguous portion of the image. For example, one "active area" that usually provides a good statistical sample of the pixels is every other pixel of every other row.

K is the number of bins in the histogram.

C is a parameter that limits the maximal rate of contrast gains that the method of the present invention applies.

$\alpha_D$ and $\alpha_L$ are parameters that determine the level of contrast gain applied for dark images and for light images, respectively.

The algorithm of the present invention includes three main stages.

In the first stage, a histogram of the luma component Y is accumulated, for pixels that lie within the active area. As noted above, the values of Y are integers in the interval [0,N]. The histogram consists of K bins, each bin spanning n=(N+1)/K consecutive luma component values.

In the second stage, a correction function for the luma component is computed based on the histogram. The correction function is designed to "equalize" the histogram, meaning that the correction function pushes pixels from densely populated regions of the histogram towards sparsely populated regions of the histogram.

In the third stage, the correction function is applied to the luma components of all the image pixels. When the method of the present invention is applied to a stream of video frames, a one-frame delay is used so that each video frame is enhanced according to its own histogram.

Histogram Accumulation

Formally, the population of the active area in the k-th bin of the histogram is $H_k = \#\{(i,j):(i,j) \in A, Y_{i,j} \in \{n(k-1), n(k-1)+1, \ldots n(k-1)+n-1\}\}$. (The notation "#T" means "the number of members of the set T".) The total number of pixels in the histogram is $$S = \sum_{k=1}^{K} H_k.$$

Figure 1:
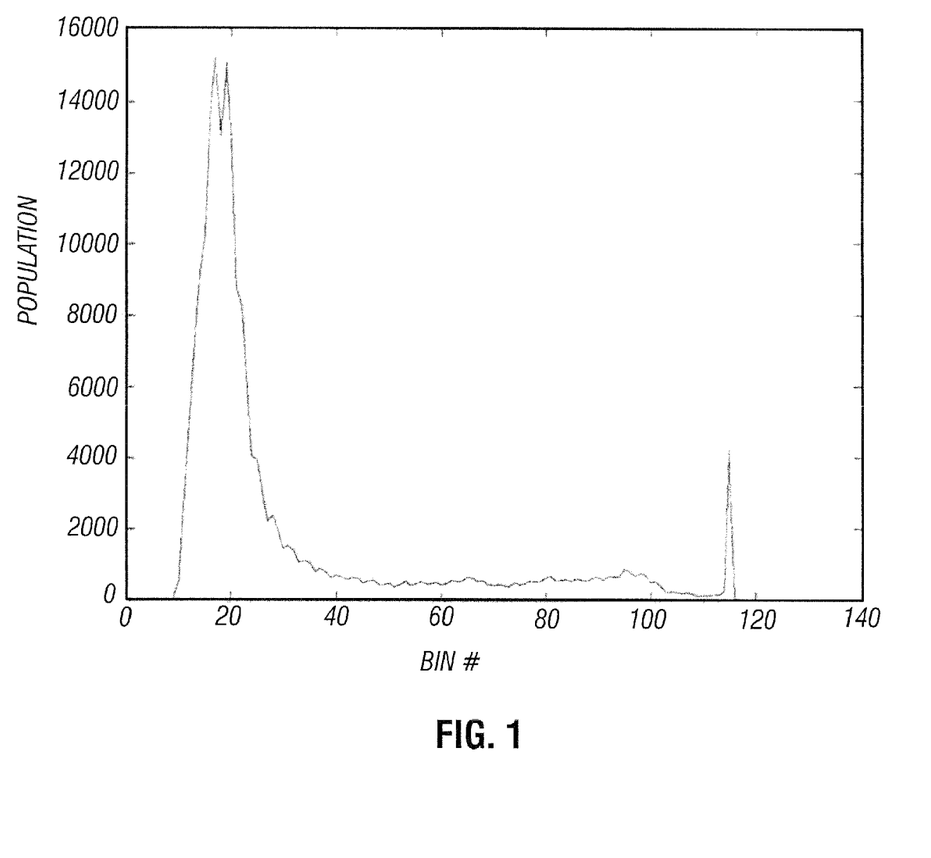
FIG. 1 is a typical histogram of active area luma component values.

Referring now to the drawings, FIG. 1 shows an example of a histogram of the luma component of active area pixels distributed among 128 bins.

Computing the Correction Function

First, the histogram is divided into p equally populated parts. p+1 indices $X_0$ through $X_p$ are found such that the accumulated number of pixels in the part of the histogram that is bounded by the indices $X_q$ and $X_{q+1}$ is approximately S/p for all values of $q \in [0,p-1]$. Formally, $X_0=0$, $X_p=K$, and, for $1 \leq q < p$, $$X_q = \min_k \sum_{t=0}^{k+1} H_t > \frac{qS}{p}.$$

Figure 2:
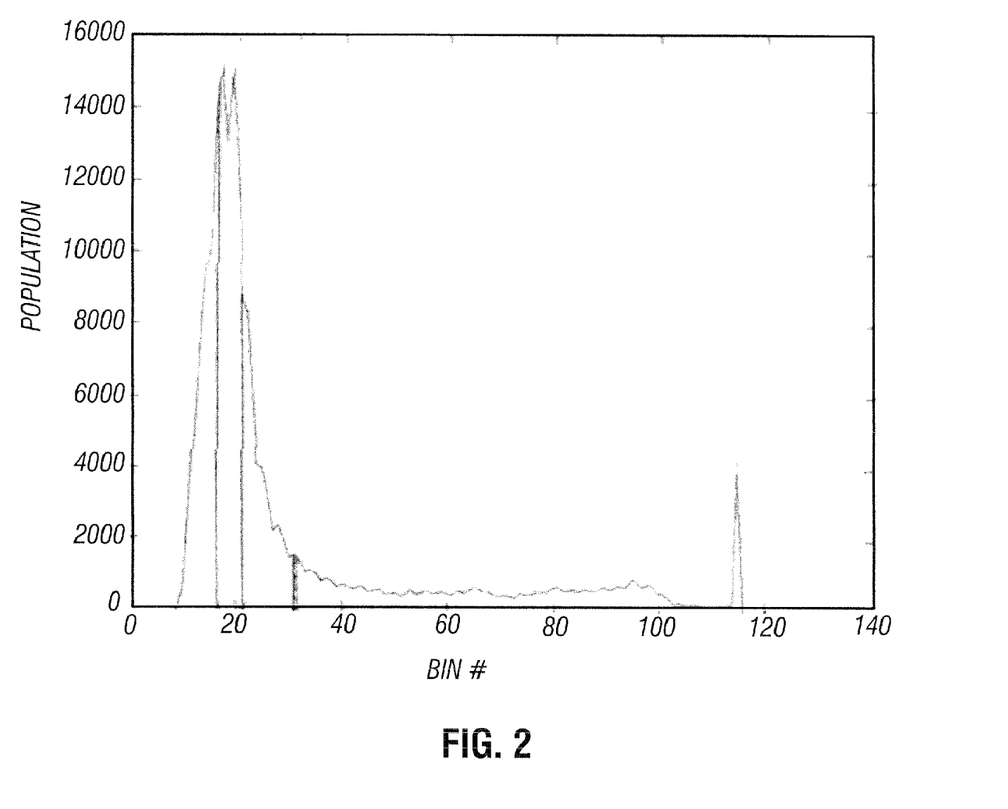
FIG. 2 shows the histogram of FIG. 1 divided into four equally populated parts.

In other words, $X_q$ is the smallest integer k for which the sum of the bin populations up to and including the k-th bin exceeds qS/p. FIG. 2 shows the histogram of FIG. 1 divided into four equally populated parts. The indices $\{X_q\}$ are called "initial bin indices" in the appended claims.

Figure 3:
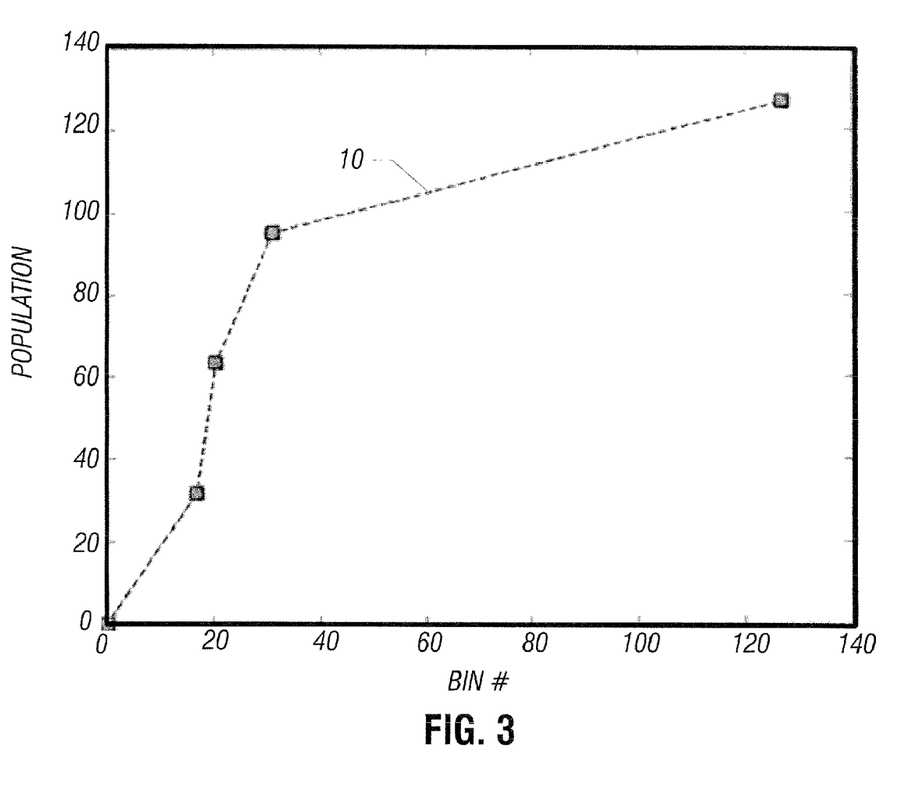
FIG. 3 is a plot the correction function corresponding to FIG. 2, with evenly spaced final bin indices.

The conceptual goal of the present invention is to adjust the luma components of the image pixels in a way that moves the indices $\{X_q\}$ so that they become evenly spaced. So for each index $X_q$, the corresponding "conceptually ideal" index $Y_q$ is qK/p. The indices $\{Y_q\}$ are examples of what are called "final bin indices" in the appended claims. The indices $\{X_q\}$ and $\{Y_q\}$ define a continuous piecewise linear function:

$$Y(y) = Y_q + \frac{Y_{q+1} - Y_q}{X_{q+1} - X_q}(y - X_q) \tag{1}$$

for $X_q < y \leq X_{q+1}$. This function has the property that $Y(X_q)=Y_q$ for all $q \in [0,p]$. FIG. 3 shows a plot 10 of this function as derived from the histogram of FIG. 2. The lower-left-most dot in FIG. 3 is at $(X_0,Y_0)=(0,0)$. The upper-right-most dot in FIG. 3 is at $(X_4,Y_4)=(128,128)$. The other three dots are at $(X_1,Y_1)=(17,31.75)$, $(X_2,Y_2)=(21,63.5)$ and $(X_3,Y_3)=(31, 95.25)$. The values of $Y_1, Y_2$ and $Y_3$ are close to the values (32, 64, 96) that would obtain for a perfectly flat histogram.

Modified Correction Function

The evenly spaced $Y_q$-s described above, while conceptually ideal, often produce images that are not esthetically pleasing. Therefore, the present invention provides the parameters C, $\alpha_D$ and $\alpha_L$ to modify the initial bin indices $\{X_q\}$ and the evenly spaced final bin indices $\{Y_q\}$ in a way that produces images that are more pleasing esthetically. Specifically, the initial bin indices are modified as follows:

$$\overline{X}_q = X_q + \frac{PC - \Delta}{P - \Delta}(qP - X_q) \tag{2}$$

where $$\Delta = \min_{q=0,\ldots p-1}(X_{q+1} - X_q),$$

P=K/p and $$\alpha = \left(1 - \frac{X_{p/2}}{K+1}\right)\alpha_D + \frac{X_{p/2}}{K+1}\alpha_L.$$

The corresponding final bin indices are $$Y_q = qP\alpha + \overline{X}_q(1-\alpha) \tag{3}$$

The corresponding piecewise linear function has shallower gradients than the function of equation (1), so that the modified bin indices $\{\overline{X}_q\}$ are more uniformly spaced than the initial bin indices while the final bin indices $\{Y_q\}$, although not evenly spaced, nevertheless also are more uniformly spaced than the initial bin indices.

Applying the Correction Function

Equation 1 needs to be modified to account for the fact that the range of the luma components is the interval [0,N], not the interval [0,K]. The modified equation, for transforming an initial luma component value y to a final luma component value ỹ, is:

$$\tilde{y} = nY_q + \frac{Y_{q+1} - Y_q}{X_{q+1} - X_q}(y - nX_q) \qquad (4)$$

for $nX_q < y \leq nX_{q+1}$. In the appended claims this relationship among $X_q$, y and $X_{q+1}$ is called the "bracketing" of y by $X_q$ and $X_{q+1}$. Note that the resulting final luma component value ỹ is "bracketed" by $Y_q$ and $Y_{q+1}$: $nY_q < \tilde{y} \leq nY_{q+1}$.

The corresponding equation for transforming an initial luma component value y to a final luma component value ỹ, using modified bin indices, is:

$$\tilde{y} = nY_q + \frac{Y_{q+1} - Y_q}{\overline{X}_{q+1} - \overline{X}_q}(y - n\overline{X}_q) \qquad (5)$$

for $nX_q < y \leq nX_{q+1}$.

If, for any particular pixel, the transformation from YUV coordinates to RGB coordinates produces illegal values of the R, G or B components, the illegal values are moved to the nearest legal values.

Figure 4:
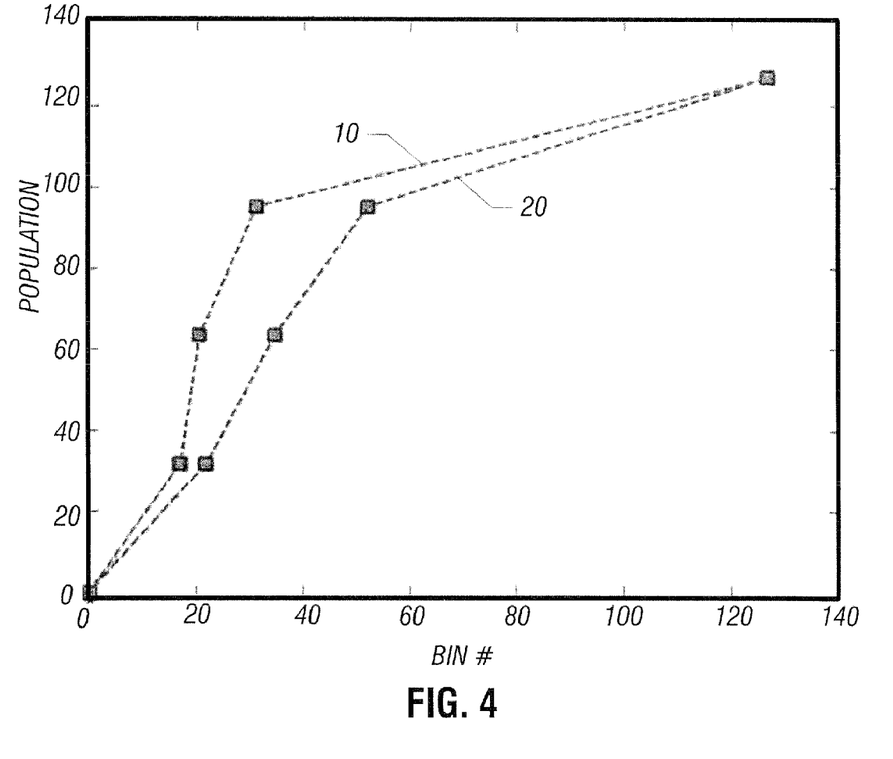
FIGS. 4 and 5 show how equations (3), (4) and (5) transform the correction function of FIG. 3 into a modified correction function.
Figure 5:
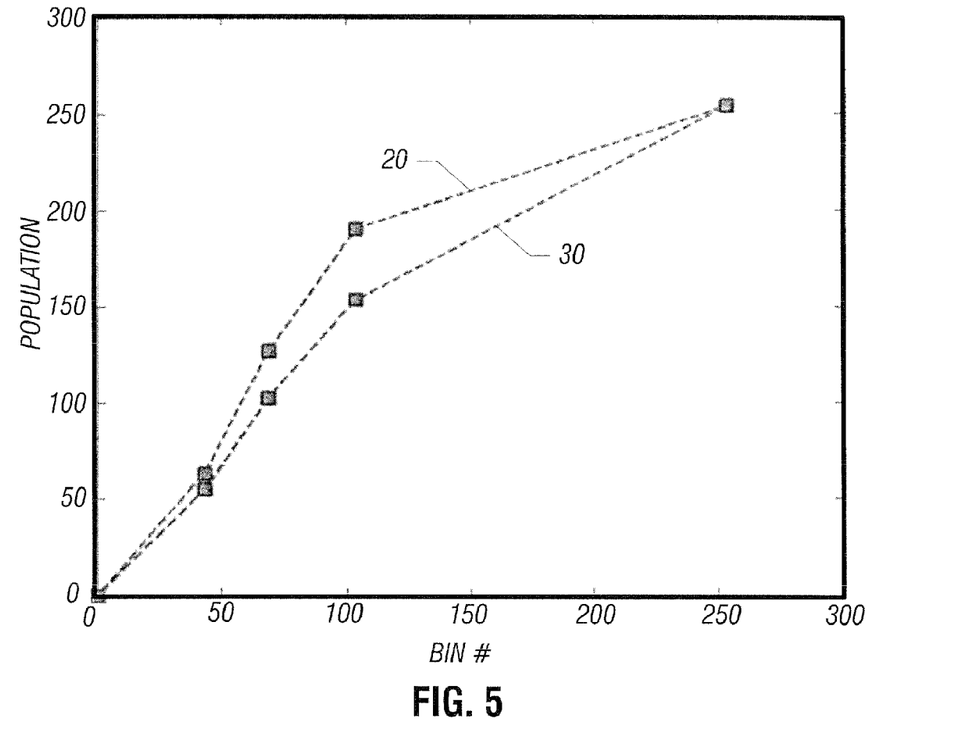
Figure 6:
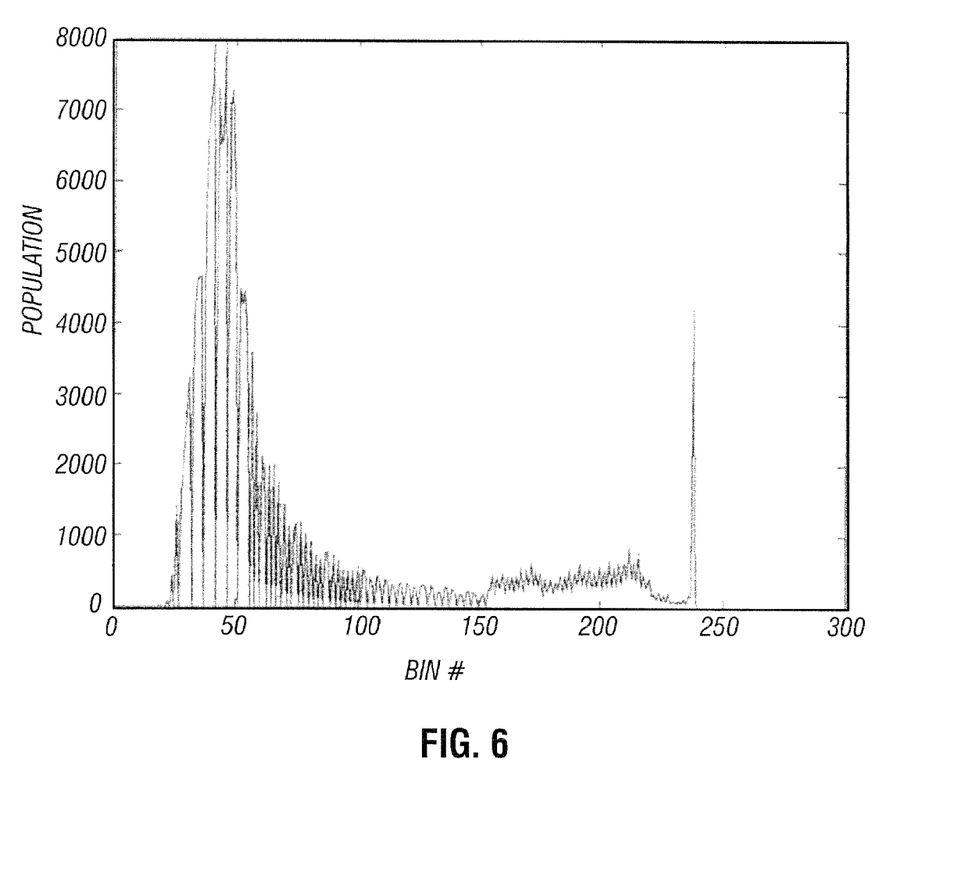
FIG. 6 is a histogram of the active area luma component values after transformation using the modified correction function.

FIG. 4 shows how equation (3) modifies plot 10 to give a modified plot 20. FIG. 5 shows how equations (4) and (5) modify plot 20 to give a further modified plot 30. The values of C, $\alpha_D$ and $\alpha_L$ that were used were C=2.5, $\alpha_D$=0.55 and $\alpha_L$=0.65. The three middle dots of plot 20 are at $(\overline{X}_1, Y_1)$= (22,31.75), $(\overline{X}_2, Y_2)$=(35,63.5), $(\overline{X}_3, Y_3)$=(52,95.25). The three middle dots of plot 30 are at $(2\overline{X}_1, \tilde{y}(Y_1))$=(44,55), $(2\overline{X}_2, \tilde{y}(Y_2))$=(70,102.5), $(2\overline{X}_3, \tilde{y}(Y_3))$=(104,154). Note that the scales of FIG. 5 are doubled relative to FIGS. 3 and 4 because n=2 in this example. Plot 20' in FIG. 5 is plot 20 rescaled accordingly. The transformation depicted in plot 30 modifies the input luma component values more gently than a similar transformation based on plot 10 would. FIG. 6 shows the histogram of the luma component of the active area pixels after transformation according to plot 30.

Figure 7:
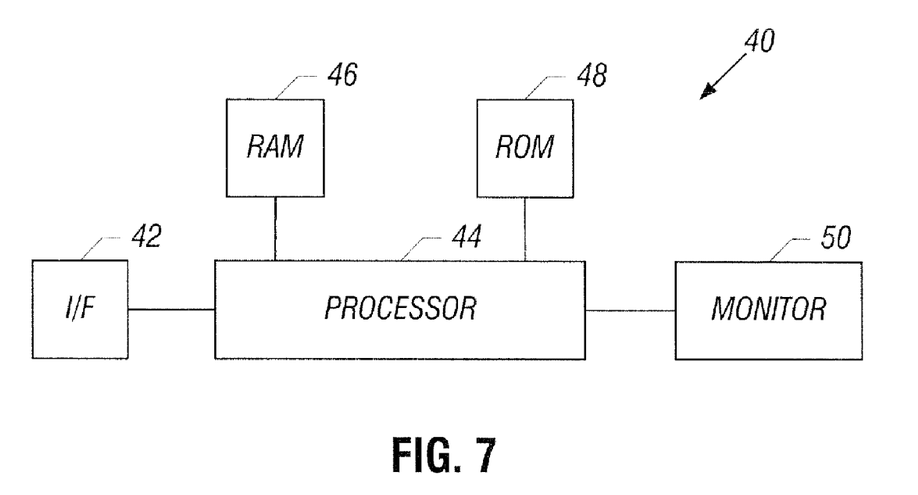
FIG. 7 is a partial high-level block diagram of a system of the present invention.

FIG. 7 is a partial high-level block diagram of a system 40 of the present invention for receiving digital images, enhancing the contrast of the digital images, and displaying the enhanced images. System 40 includes an interface 42 for receiving the images from an external device such as a video camera, a random access memory (RAM) 46 for storing the images, a read-only memory (ROM) 48 for storing executable code for implementing the method of the present invention as described above, a processor 44 for executing the code stored in ROM 48 to enhance the contrast of the images stored in RAM 46, and a monitor 50 for displaying the contrast-enhanced images.

In system 40, the definition of the active area and the values of the parameters C, $\alpha_D$ and $\alpha_L$ are hardwired in the code that is stored in ROM 48. Alternative systems of the present invention include user interfaces for controlling these parameters.

While the invention has been described with respect to a limited number of embodiments, it will be appreciated that many variations, modifications and other applications of the invention may be made.

What is claimed is:

1. For an image that includes a plurality of pixels, each pixel having a respective initial luma value and two respective initial chroma values, a method of adjusting the initial luma values, comprising the steps of using a computer to implement the steps of:

(a) forming a histogram of the initial luma values of at least a portion of the pixels;
(b) computing a plurality of initial bin indices that partitions said histogram into a plurality of bins that have substantially equal populations;
(c) mapping said initial bin indices into a plurality of final bin indices that are spaced more uniformly than said initial bin indices; and
(d) adjusting the initial luma values in accordance with said final bin indices, thereby obtaining, for each pixel, a respective final luma value.

2. The method of claim 1, wherein said histogram is formed using initial luma values of only a portion of the pixels.

3. The method of claim 1, wherein said final bin indices are substantially equally spaced.

4. The method of claim 3, wherein the initial luma values are adjusted in accordance with said initial bin indices.

5. The method of claim 4, wherein each said initial luma value is adjusted by steps including:
  (i) determining a pair of said initial bin indices that bracket said each initial luma value; and
  (ii) transforming said each initial luma value into a respective final luma value that is bracketed by a pair of said final bin indices that corresponds to said pair of initial bin values.

6. The method of claim 5, wherein said transforming is piecewise linear.

7. The method of claim 1, wherein said final bin indices are determined a postiori.

8. The method of claim 7, wherein said mapping includes modifying said initial bin indices, thereby obtaining a corresponding plurality of modified bin indices that are spaced more uniformly than said initial bin indices, the initial luma values then being adjusted in accordance with said modified bin indices.

9. The method of claim 8, wherein each said initial luma value is adjusted by steps including:
  (i) determining a pair of said modified bin indices that bracket said each initial luma value; and
  (ii) transforming said each initial luma value into a respective final luma value that is bracketed by a pair of said final bin indices that corresponds to said pair of modified bin values.

10. The method of claim 9, wherein said transforming is piecewise linear.

11. The method of claim 1, wherein said mapping is effected by steps including:
  (i) mapping said initial bin indices into a plurality of intermediate bin indices that are substantially equally spaced; and
  (ii) mapping said intermediate bin indices into said final bin indices in accordance with a desired degree of contrast gain.

12. For an image that includes a plurality of pixels, each pixel having a respective initial value, a method of adjusting the initial values, comprising the steps of using a computer to implement the steps of:

(a) forming a histogram of the initial values of at least a portion of the pixels;
(b) computing a plurality of initial bin indices that partitions said histogram into a plurality of bins that have substantially equal populations;
(c) mapping said initial bin indices into a plurality of final bin indices that are spaced more uniformly than said initial bin indices; and (d) adjusting the initial values in accordance with said final bin indices, thereby obtaining, for each pixel, a respective final value.

13. The method of claim 12, wherein said histogram is formed using initial values of only a portion of the pixels.

14. The method of claim 12, wherein said final bin indices are substantially equally spaced.

15. The method of claim 14, wherein the initial values are adjusted in accordance with said initial bin indices.

16. The method of claim 15, wherein each said initial value is adjusted by steps including:
   (i) determining a pair of said initial bin indices that bracket said each initial value; and
   (ii) transforming said each initial value into a respective final value that is bracketed by a pair of said final bin indices that corresponds to said pair of initial bin values.

17. The method of claim 16, wherein said transforming is piecewise linear.

18. The method of claim 12, wherein said final bin indices are determined a postiori.

19. The method of claim 18, wherein said mapping includes modifying said initial bin indices, thereby obtaining a corresponding plurality of modified bin indices that are spaced more uniformly than said initial bin indices, the initial values then being adjusted in accordance with said modified bin indices.

20. The method of claim 19, wherein each said initial value is adjusted by steps including:
   (i) determining a pair of said modified bin indices that bracket said each initial value; and
   (ii) transforming said initial value into a respective final value that is bracketed by a pair of said final bin indices that corresponds to said pair of modified bin values.

21. The method of claim 20, wherein said transforming is piecewise linear.

22. The method of claim 12, wherein said mapping is effected by steps including:
   (i) mapping said initial bin indices into a plurality of intermediate bin indices that are substantially equally spaced; and
   (ii) mapping said intermediate bin indices into said final bin indices in accordance with a desired degree of contrast gain.

23. A system, comprising:
   (a) a memory for storing an image that includes a plurality of pixels, each pixel having a respective value; and
   (b) a processor for:
      (i) forming a histogram of said values of at least a portion of the pixels,
      (ii) computing a plurality of initial bin indices that partitions said histogram into a plurality of bins that have substantially equal populations,
      (iii) mapping said initial bin indices into a plurality of final bin indices that are spaced more uniformly than said initial bin indices, and
      (iv) adjusting said values in accordance with said final bin indices.

24. The system of claim 23, wherein said image is a monochrome image.

25. The system of claim 23, wherein said image is a color image, said values being initial luma values.

26. A computer readable storage medium having computer readable code embodied on said computer readable storage medium, the computer readable code for enabling a computer to process an image that includes a plurality of pixels, each pixel having a respective value, the computer readable code comprising:
   (a) program code for forming a histogram of the values of at least a portion of the pixels;
   (b) program code for computing a plurality of initial bin indices that partitions said histogram into a plurality of bins that have substantially equal populations;
   (c) program code for mapping said initial bin indices into a plurality of final bin indices that are spaced more uniformly than said initial bin indices; and
   (d) program code for adjusting said values in accordance with said final bin indices.

* * * * *